(12) United States Patent
Jacob et al.

(10) Patent No.: US 7,543,595 B2
(45) Date of Patent: Jun. 9, 2009

(54) VALVE CALIBRATION METHOD AND APPARATUS

(75) Inventors: Steven D. Jacob, Oro Valley, AZ (US); William Glaser, Buffalo Grove, IL (US); Paul E. Pelczynski, Lake Zurich, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 1284 days.

(21) Appl. No.: 10/609,007

(22) Filed: Jun. 27, 2003

(65) Prior Publication Data
US 2004/0069348 A1    Apr. 15, 2004

Related U.S. Application Data

(60) Provisional application No. 60/392,465, filed on Jun. 28, 2002.

(51) Int. Cl.
*G05D 7/06* (2006.01)
(52) U.S. Cl. .................. 137/9; 137/486; 137/487.5; 73/1.16; 73/1.34; 702/100
(58) Field of Classification Search ............ 73/1.16, 73/1.34, 168; 137/9, 486, 487.5, 2; 702/100
See application file for complete search history.

(56) References Cited

U.S. PATENT DOCUMENTS

| | | | | |
|---|---|---|---|---|
| 5,003,810 A | * | 4/1991 | Jepson et al. | 73/196 |
| 5,304,093 A | * | 4/1994 | Sharp et al. | 454/61 |
| 5,435,779 A | * | 7/1995 | Sharp et al. | 454/61 |
| 5,504,681 A | * | 4/1996 | Sherman | 701/101 |
| 5,950,668 A | * | 9/1999 | Baumann | 137/487.5 |
| 5,975,126 A | * | 11/1999 | Bump et al. | 137/487.5 |
| 6,539,968 B1 | * | 4/2003 | White et al. | 137/10 |

FOREIGN PATENT DOCUMENTS

EP        0 834 723 A1 *    4/1998

* cited by examiner

*Primary Examiner*—Kevin L Lee

(57) ABSTRACT

An arrangement for calibrating a Venturi valve includes a source of flow measurements and a processing circuit. The Venturi valve has a variable shaft position and is operable to provide an air flow corresponding to the variable shaft position. The processing circuit is operable to provide a plurality of voltages to an actuator, the actuator operable to change the variable shaft position dependent on said plurality of voltages. The processing circuit is also operable to receive from the source of flow measurements a flow measure for each variable shaft position corresponding to each of the plurality of voltages. The processing circuit is further operable to store information representative of the relationship between each of the plurality of voltages and the flow measures.

26 Claims, 6 Drawing Sheets

VALVE CALIBRATION METHOD AND APPARATUS

The present application claims the benefit of U.S. Provisional Patent Application Ser. No. 60/392,465, filed Jun. 28, 2002, and which is incorporated herein by reference.

FIELD OF THE INVENTION

The present invention relates generally to flow valve systems, and more particularly, to calibration of such valve systems.

BACKGROUND OF THE INVENTION

A Venturi valve is a valve device that may be used to regulate, among other things, air flow velocity. In general, a Venturi valve has an input connected to a source of air flow and an output at which regulated air flow is provided. The Venturi valve is self-adjusting, ideally maintaining a constant output air flow velocity irrespective of changes in source air pressure or flow velocity. To this end, the Venturi valve incorporates valve geometry and a spring-loaded mechanism that cooperate to maintain the more or less constant output flow velocity. When source air pressure increases, the pressure against the spring-loaded mechanism urges the valve further closed, thereby compensating for the increase in the source flow velocity. Similarly, when the source flow pressure decreases, the reduced pressure allows the spring-loaded mechanism to urge the valve further open, thereby compensating for the reduction in source flow velocity.

In addition to being self-adjusting to maintain a constant air flow velocity, Venturi valves are preferably adjustable to provide a selectable level of air flow. In other words, a Venturi valve may be adjusted to provide a select output air flow velocity, and then the Venturi valve will self-regulate to maintain that select air flow velocity. To perform the adjustment, an electro-mechanical actuator or other type of actuator adjusts the position of a shaft that holds the stopper or cone of the valve. The position of the shaft defines the output air flow velocity.

Venturi valves have a number of applications, including those in the building control system industry. Venturi valves may be used to control air flow into or out of a room in a building, or to control exhaust air flow from a fume hood in a laboratory environment. By way of example, U.S. Pat. No. 4,215,627 describes the use of a rudimentary Venturi valve in a fume hood environment. U.S. Pat. No. 4,215,627 does not describe, however, the use of an adjustable Venturi valve.

More recently, U.S. Pat. No. 5,304,093 to Sharp et al. (hereinafter the Sharp patent) describes an adjustable Venturi valve that may be used in a laboratory environment. One issue that arises with adjustable Venturi valves is determining the proper shaft or crank arm position that is necessary to achieve a desired amount of flow velocity. To address this problem, the Sharp patent describes a control circuit having an input/output relationship that correlates shaft position to desired flow values. In operation, an input signal representative of a desired flow value is provided to the control circuit, and then the control circuit generates an output signal representative of a corresponding shaft position. The output signal is conditioned and provided to an actuator that positions the shaft accordingly. Closed-loop control may be used to fine tune the shaft position. Once the shaft is in position, the Venturi valve operates to maintain the desired flow regardless of input air flow.

One problem with adjustable Venturi valve described in the Sharp patent is that the relationship between the shaft position and the output air flow velocity necessarily varies from device to device, due to manufacturing tolerances and natural variations in the manufactured springs used in Venturi valves. Thus, each device must ordinarily be calibrated to ensure that the relationship between shaft position and output air flow velocity is reasonably accurate.

Venturi valves are calibrated in the factory using special calibration fixtures. While factory calibration has advantages, it cannot account for changes in the operation of the valve arising from mounting considerations. Moreover, specific environmental conditions to which the Venturi valve is exposed can affect its calibration accuracy. Thus, when the valve is finally installed, the factory calibration may be somewhat inaccurate.

There is a need, therefore, for a way of avoiding or compensating for calibration errors that can result from alteration of operating parameters that occur upon installation of a Venturi valve in its final operation location.

SUMMARY OF THE INVENTION

The present invention addresses the above needs, as well as others, by implementing a calibration arrangement that may be used after field installation of a Venturi valve. To this end, the arrangement includes a flow sensing device and a processing circuit. The processing circuit and the flow sensing device cooperate to identify a relationship between a plurality of actuator voltage values and flow values. The relationship may later be used to identify the actuator voltage that will cause the valve to generate a desired flow rate. Application of the actuator voltage causes the actuator to move the valve shaft into the position that results in approximately the desired air flow.

A first embodiment of the invention is an arrangement for calibrating a Venturi valve. The Venturi valve has a variable shaft position and is operable to provide an air flow corresponding to the variable shaft position. The arrangement includes a source of flow measurements and a processing circuit. The processing circuit is operable to provide a plurality of voltages to an actuator, the actuator operable to change the variable shaft position dependent on said plurality of voltages. The processing circuit is also operable to receive from the source of flow measurements a flow measure for each variable shaft position corresponding to each of the plurality of voltages. The processing circuit is further operable to store information representative of the relationship between each of the plurality of voltages and the flow measures.

Another embodiment of the invention is a method of calibrating a Venturi valve. The method includes determining a first actuator voltage associated with a first flow value and determining a second actuator voltage associated with a second flow value. The method also includes providing a set of other voltages to the actuator and obtaining a corresponding flow measurement for each of the set of other voltages, the set of other voltages being between the first actuator voltage and the second actuator voltage. The method further includes storing information representative of the relationship between each of a plurality of voltages and the flow measures, the plurality of voltages including the first actuator voltage, the second actuator voltage and the set of other voltages.

By using flow values to generate the relationship between output voltages and air flows, the calibration may be performed in situ , or in other words, after the Venturi valve has been installed in the building or facility.

The above described features and advantages, as well as others, will become more readily apparent to those of ordinary skill in the art by reference to the following detailed description and accompanying drawings.

DETAILED DESCRIPTION

Figure 1:
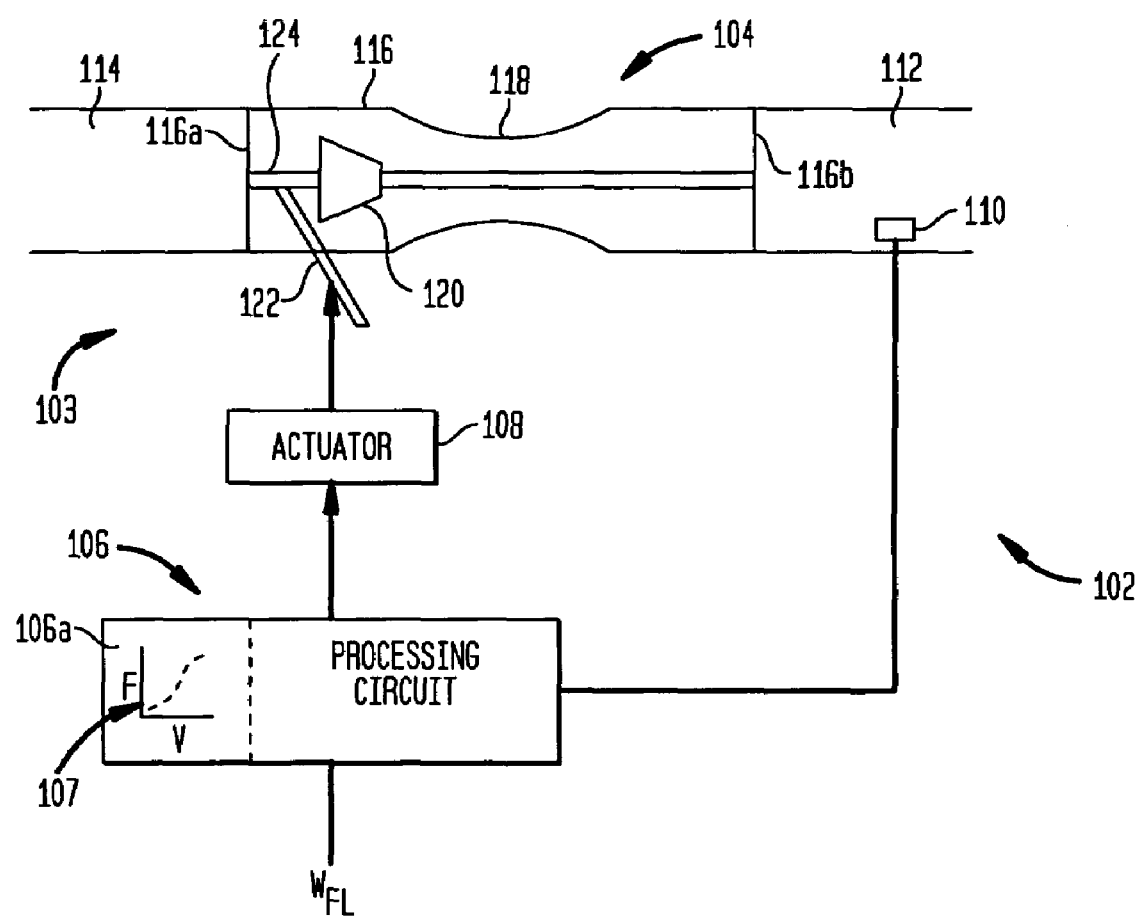
FIG. 1 shows a schematic block diagram of an exemplary Venturi valve system and an exemplary arrangement for calibrating a Venturi valve according to the present invention.

FIG. 1 shows a schematic block diagram of an exemplary Venturi valve system 103 and an exemplary arrangement 102 for calibrating a Venturi valve system according to the present invention. In the exemplary embodiment described herein, the Venturi valve system 103 is installed quasi-permanently within a facility. In other words, the Venturi valve system 103 will not typically undergo further physical movement or installation prior to performing its intended function of controlling ventilation.

The valve system 103 includes a Venturi valve 104 and an actuator 108. The Venturi valve 104 has the general shape of a common Venturi valve as is known in the art. Accordingly, the Venturi valve 104 includes a shell 116 having an input 116a and an output 116b. The shell 116 is in the general form of a cylinder having a concentrically compressed center section 118. The valve 104 further includes a cone 120, a crank arm 122, and a shaft 124. The shaft 124 is axially aligned within the shell 116, and is axially movable with respect to the shell 116. The crank arm 122 is movably attached to the shaft 124 and is operable to move and control the axial position of the shaft 124 within the shell 116. The cone 120 is movably secured to the shaft 124 via a spring mechanism, not shown, but which is known in the art, that is biased against a force of air received at the input 116a.

The Venturi valve 104 is displaced within an air conduit. The air conduit may be considered to include a source portion of the conduit, or simply source conduit 114, and an output portion of the conduit, or simply output conduit 112. As is known in the art, the Venturi valve 104 operates to provide a relatively constant air flow velocity within the output conduit 112 over wide range of input air pressures within the source conduit 114. The actual level of the constant air flow velocity provided to the output conduit 112 is dependent upon the axial position of shaft 124.

The actuator 108 is a device that is operable to receive an actuator voltage and cause movement of the shaft 124 (via the crank arm 122) to a position that corresponds to the actuator voltage. Such actuators are well known and may take many forms. In general, the actuator 108 holds moves the shaft 124 and holds the shaft 124 in the position corresponding to the actuator voltage. The relationship between actuator voltage and shaft position in the Venturi valve system is generally known, but may vary due to assembly, manufacturing or environmental tolerances.

Such adjustable Venturi valve systems are well known, as illustrated by U.S. Pat. No. 5,304,093 and 5,215,497, both of which are incorporated herein by reference.

The calibration arrangement 102 is operably coupled to the valve 104, and also preferably comprises the operational control mechanism for the valve during normal (non-calibration) operations. The calibration arrangement 102 includes a processing circuit 106 and a flow measurement device 110.

The flow sensor 110 is a transducer device or the like that is operable to generate a flow sense signal representative of an air flow velocity measurement, or simply air flow. The flow sensor 110 is operably disposed to provided flow sense signals representative of the air flow present within the output conduit 112. To this end, the flow sensor 110 is preferably disposed at least in part within the output conduit 112.

The processing circuit 106 is a processing device or set of devices, as well as corresponding interface and memory circuitry. The processing circuit 106 is operably coupled to receive flow sense signals from the flow sensor 110. The processing circuit 106 is further operably coupled to provide actuator voltage signals to the actuator 108. The actuator voltage signals may either be actuator voltages themselves, or signals representative of actuator voltages that are subsequently converted to actuator voltages. As discussed above, the actuator 108 is operable to control the position of the shaft 124 (and thus control the output air flow of the valve 104) responsive to such actuator voltage signals.

In performing a calibration operation, the processing circuit 106 is operable to provide a plurality of voltages to the actuator 108, which in turn cause the actuator 108 to change the position of the shaft 124 accordingly. The processing circuit 106 is further operable to receive from the flow sensor 110 a flow measure corresponding to each of the plurality of voltages provided to the actuator 108. The processing circuit 106 is also operable to store information representative of the relationship between each of the plurality of voltages and the flow measures. The processing circuit 106 in the exemplary embodiment described herein stores the voltages in a nonvolatile memory 106a, which preferably forms a part of the processing circuit 106.

This relationship between the plurality of voltages and the flow measures constitutes the calibration information. In subsequent normal operations, the Venturi valve 104 may achieve a desired air flow by providing the actuator 108 with an actuator voltage that corresponds to the desired air flow as designated by this stored relationship.

In a preferred embodiment, the processing circuit 106 stores the plurality of voltages and their corresponding flow measures as a table of points, referred to as the flow-voltage table 107. Each point of the table has a flow value and a corresponding actuator voltage value. During normal, non-calibration operation, desired flow rates that do not exactly match up with a flow value corresponding to a table point are interpolated using the nearest adjacent table points. Further detail regarding the generation and use of the flow-voltage table 107 and its use in non-calibration operation is provided further below.

In a general calibration operation, the valve 104 is in an environment wherein the source conduit 114 provides a reasonable bias air flow that is at least sufficient to provide a maximum desired air flow when the Venturi valve 104 is at its maximum setting.

To perform the calibration, the processing circuit 106 provides each of a set of actuator voltages to the actuator 108. For each voltage, the following operations take place. First, the actuator 108 moves the crank arm 122, which in turn moves the shaft 124 to a corresponding axial position. As discussed above, the position of the actuator 108 corresponding to each actuator voltage is roughly predetermined for the valve 104, but can be affected by manufacturing variances, and environmental effects and installation manipulation on elements of the valve 104.

Once the actuator 108 moves the crank arm 124 and shaft 122 to the position corresponding to the input voltage, the valve 104 provides an air flow to the output conduit 112 that corresponds to the current position of the shaft 122. The relationship between output air flow and shaft position is roughly predetermined. Again, however, manufacturing tolerances, environmental and installation effects can alter the response of various elements of the valve 104, such as the spring mechanism, not shown.

The processing circuit 106 receives an air flow measurement from the flow sensor 108 corresponding to each voltage. The processing circuit 106 records (i.e. stores in a memory 106a) the flow measurement corresponding to the input actuator voltage. The processing circuit 106 thereafter provides another input actuator voltage to the actuator 108 and the process repeats. In general, the processing circuit 106 provides a plurality of actuator voltages designed to at least roughly cover the range of usable flow measurements. The voltages and their corresponding flow values are stored as a flow-voltage table 107.

It will be appreciated that the relationship between actuator voltage and flow values may take another form, for example, an nth order polynomial. To this end, the processing circuit 106 would employ curve fitting techniques to derive a polynomial of the desired order using the plurality of actuator voltages and their corresponding flow values obtained during calibration.

Figure 2:
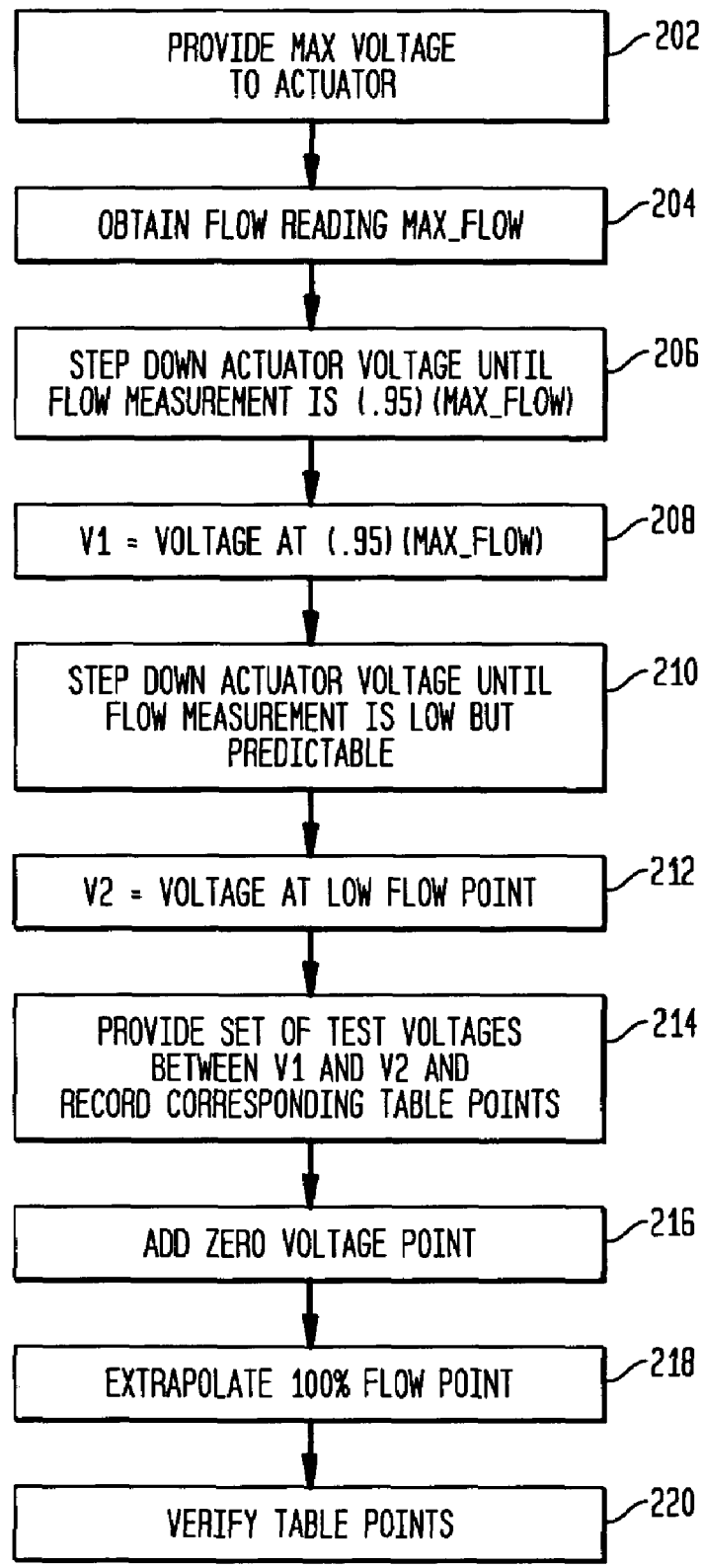
FIG. 2 shows a flow diagram of an exemplary set of operations that may be carried out by the processing circuit of the calibration arrangement of FIG. 1 to perform a calibration function.

FIG. 2 shows in further detail a flow diagram of an exemplary set of operations of the processing circuit 106 to calibrate a Venturi valve such as the valve 104 of FIG. 1. In general, the processing circuit 106 first defines upper and lower "active" range limits and then obtains flow measurements for a number of actuator voltages located between the range limits.

It is noted that in a rudimentary design, one could simply take flow measurements for even voltage increments from 0 volts to 10 volts and build the table 107 with the resulting flow-voltage points. For example, one could take and store the flow measurements at 0 volts, 0.5 volts, 1.0 volts, 1.5 volts, and so forth, up to 10.0 volts. However, the relationship between actuator voltage and output flow is not most efficiently modeled by points located at even voltage increments.

Figure 3:
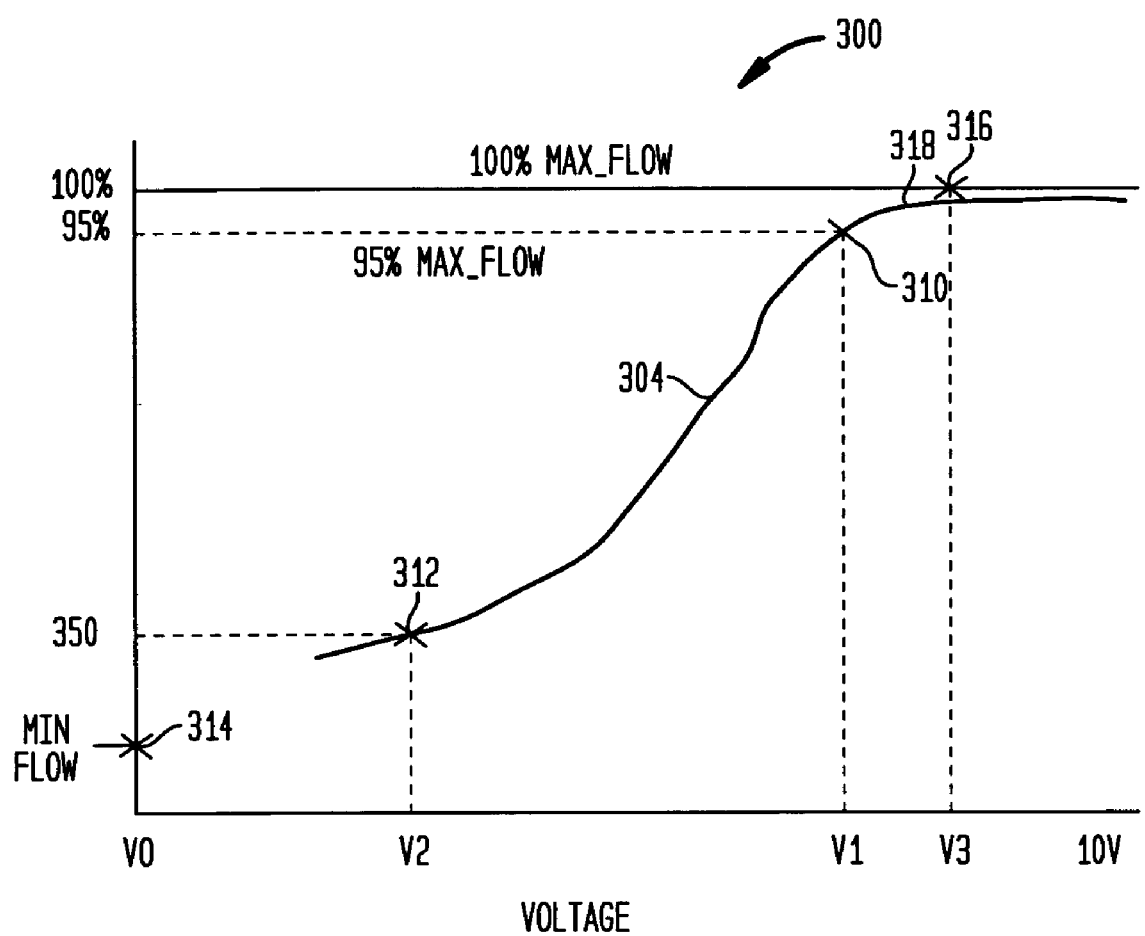
FIG. 3 shows a first chart of air flow as a function of voltage that is used to illustrate a portion of the calibration process of FIG. 2.

Indeed, in typical Venturi valve systems, the graph of flow as a function of voltage is asymptotic at or near the maximum flow, and behaves unpredictably at or near the minimum flow. Thus, flow-voltage data at the minimum and maximum voltage values is not very useful. By way of example, line 304 of the flow-voltage graph 300 of FIG. 3 illustrates the response output air flow versus input actuator voltage for an exemplary (and typical) Venturi valve system such as the system 103 of FIG. 1. The line 304 is asymptotic near the maximum voltage values, and asymptotic and/or otherwise ungraphable at minimum voltage values. Because the points at the voltage extremes are not useful, it would not be efficient to calibrate by simply taking flow measurements at even increments between zero volts and the maximum voltage.

Instead, as shown in FIG. 3, the line 304 exhibits a reliable "active region" between the voltages V1 and V2. To increase efficiency, the embodiment described herein primarily measures calibration points in this active region.

Referring again to FIG. 2, steps 202 through 206 operate to determine the upper range limit (V1) of the active region. In particular, in step 202, the processing circuit 106 provides a maximum actuator voltage to the actuator 108. The maximum actuator voltage is the nominal maximum input voltage for the actuator 108, which is typically specified for any actuator. In the exemplary embodiment described herein, the maximum actuator voltage is 10 volts.

After allowing a sufficient time for the actuator 108 to adjust the position of the shaft 124, the processing circuit 106 executes step 204. In step 204, the processing circuit 106 obtains a flow reading MAX_FLOW from the flow sensor 110. The value MAX_FLOW represents the maximum flow of the valve 104 as installed.

To define the upper limit of the active range, the exemplary embodiment described herein attempts to locate a point at which the flow rate is no longer asymptotic with respect to voltage. To this end, in step 206, the processing circuit 106 steps down the actuator voltage and obtains flow readings until a point is reached in which the measured flow is a predetermined percentage of MAX_FLOW. In the embodiment described herein, the predetermined percentage is preferably 95%. Thus, in step 208, the processing circuit 106 stores the voltage, V1, along with its measured flow rate, which is approximately (0.95)( MAX_FLOW), as the first point of the flow-voltage table 107. That point is represented by point 310 of FIG. 3.

Thereafter, in step 210, the processing circuit 206 identifies the lowest actuator voltage at which the relationship of flow versus voltage remains predictable and non-asymptotic. To this end, a given valve will typically have a minimum rated controllable flow value or at least an estimated minimum controllable flow value. For example, the valve 104 may have a minimum controllable flow value of 350 feet per minute. This means that, the behavior of the valve 104 at non-zero flow rates significantly below 350 feet per minute cannot be predictably controlled, typically due to mechanical limitations.

Thus, in step 210, the processing circuit 206 steps down the actuator voltage until the measured flow rate is approximately the minimum controllable flow value, e.g. 350 feet per minute. In step 212, the processing circuit 106 stores the voltage, V2, along with its measured flow rate, which is approximately the minimum controllable flow value, e.g. 350 fpm, as the second point of the table 107. That point is represented by point 312 of FIG. 3.

The processing circuit 106 thereafter defines a set of test voltages between V1 and V2 for which flow measurements will be taken. The processing circuit 102 stores table points for such voltages and flow measurements, and then extrapolates a zero voltage and maximum flow end points.

Figure 4:
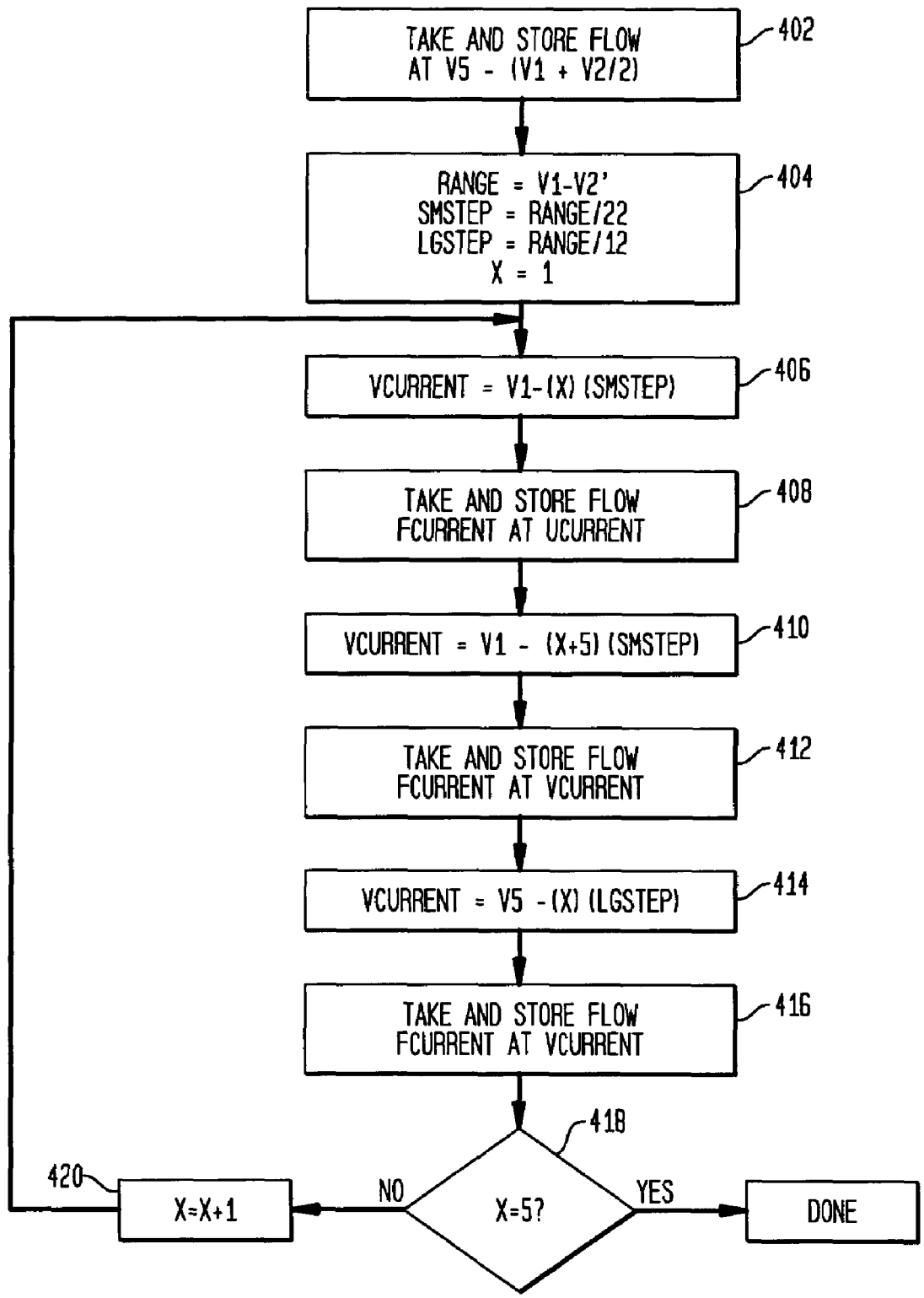
FIG. 4 shows a flow diagram of an exemplary set of operations that may be carried out to obtain a set of flow measurements and their corresponding actuator voltages.

In particular, in step 214, the processing circuit 106 generates additional table points corresponding to actuator voltages between V1 and V2. Any number of points may be used, but the embodiment described herein employs sixteen points, which is sufficient to describe the curve in piece-wise linear fashion. A simple method of obtaining piece-voltage table points is to obtain a flow measurement at each of a set of voltages that are evenly spaced between V1 and V2. In other words, the processing circuit could provide actuator voltages, V2+n((V2−V1)/17) where n=1 to 16, and store the corresponding flow measurements. FIG. 4, discussed below in further detail, describes an alternative process for selecting the actuator voltages between V1 and V2 that takes into account the characteristic shape of the flow voltage curve of typical Venturi valves.

In any event, referring back to FIG. 2, after the intermediate set of points is defined in step 214, the processing circuit 106 executes step 216. In step 216, the processing circuit 106 identifies a point for the flow-voltage table 107 that corresponds to zero voltage. To this end, referring to FIG. 3, the processing circuit 106 preferably obtains a minimum flow value for the valve 104. In particular, a minimum flow value is often defined for a valve as a specification, or may be otherwise determined. If specified, the minimum flow value may be entered into the processing circuit 106 via an I/O device, such as a field programming portable computer or other portable programming device, not shown. In step 216, the processing circuit 106 stores the voltage V0, zero volts, and the minimum flow value as another point in the flow-voltage table 107. FIG. 3 shows such a point as point 314 on the graph 300.

It will be appreciated that the minimum flow voltage may alternatively be obtained by measuring the actual flow at zero actuator volts. However, because behavior of the valve 104 and/or flow sensor 110 at low voltages can have significant variation, it is often preferable to use a specified minimum flow as discussed above. The specified minimum flow value may be more representative of the norm than a single measurement.

In step 218, the processing circuit 106 extrapolates a MAX_FLOW flow point. To this end, the processing circuit 106 preferably extrapolates upward from V1 until the MAX_FLOW flow level is intercepted. Referring to FIG. 3, to extrapolate upward, the processing circuit 106 determines the intercept point using an approximation of the first derivative of the response line 304 at the point 310 corresponding to the voltage V1. To this end, the processing circuit 106 may suitably use a line 318 drawn through the point 310 and the next lower table point, which would have been determined in step 214. The point (point 316 of FIG. 3) at which the line 318 intercepts the MAX_FLOW level is used as the estimated voltage V3 that corresponds to a flow rate of MAX_FLOW. The processing circuit 106 stores the table point corresponding to V3 and MAX_FLOW as a part of the flow-voltage table 107.

Thus, after step 218, the processing circuit 106 has determined and stored a table of actuator voltages and their corresponding measured flow rates that includes points corresponding to voltages V0, V1, V2, V3 and a set of points corresponding to a set of voltages between V1 and V2. Such points, each representative of the actuator voltage and its corresponding flow value are stored in the flow-voltage table 107 in the memory 106a.

In step 220, the processing circuit 106 goes through a verification process to determine whether any of the points are not valid and should be discarded. An exemplary validation technique is described below in connection with FIG. 6.

Thereafter, the actuator 108 and valve 104 may be connected to a controller. Such controller would use the stored table 107 to determine the actuator voltage to provide in response to a flow rate set point. In a preferred embodiment, the processing circuit 106 itself constitutes the controller that uses the stored table 107 to generate actuator voltage signals in response to flow rate set points.

FIG. 4 shows a detailed flow diagram of an alternative method of generating a set of intermediate points on the flow-voltage table 107 stored by the processing circuit 106. Thus, the flow diagram of FIG. 4 represents an exemplary detailed set of operations that may be used as step 214 of FIG. 2. In general, the processing circuit 106 effectively divides the range from V2 to V1 in half, and plots five points in the lower half and ten points in the upper half. In addition, the processing circuit 106 uses interleaving to step through the various points. In other words, instead of stepping the voltage up or down incrementally between V1 and V2, the processing circuit 106 steps down every fifth voltage increment in a moving pattern. The processing circuit 106 uses interleaving to avoid inertia-related errors associated with attempting to move the shaft 124 in very small increments.

Referring now specifically to the steps of FIG. 4, in step 402, the halfway point between V1 and V2 is added to the table. In particular, the processing circuit 106 provides an actuator voltage of (V1+V2)/2 and then obtains a flow measurement. The processing circuit 106 stores the voltage V5 and its corresponding measured flow rate as a point 511 of the flow-voltage table 107. (See FIG. 5)

There after in step 404, the processing circuit 106 defines the value RANGE=V1−V2, the value SMSTEP=RANGE/22 and the value LGSTEP=RANGE/12. Effectively, SMSTEP represents the voltage step between adjacent points in the upper half of the range between V1 and V2, and LGSTEP represents the voltage step between adjacent points in the lower half of the range between V1 and V2. The processing circuit 106 also sets a counter variable x=1.

Figure 5:
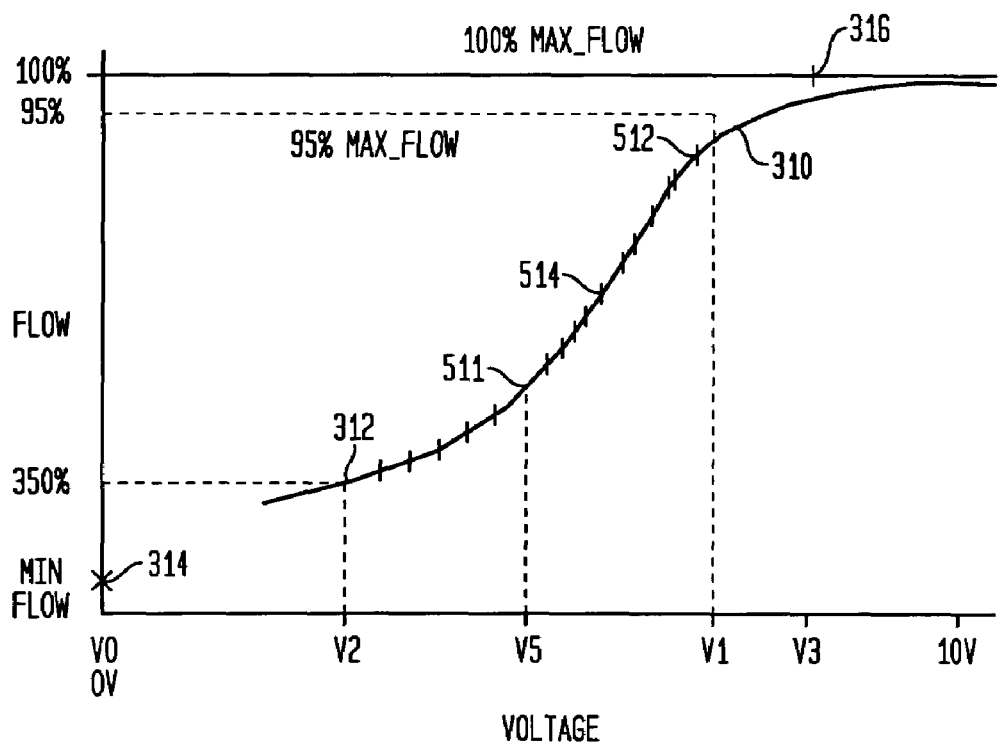
FIG. 5 shows a second chart of air flow as a function of voltage that is used to illustrate a portion of the calibration process of FIGS. 2 and 4.

In step 406, the processing circuit 106 generates a voltage VCURRENT equal to V1−(x)SMSTEP. Thereafter, in step 408, the processing circuit 106 obtains the flow reading FCURRENT from the flow sensor 110. The processing circuit 106 stores the table point having the voltage VCURRENT and its corresponding flow FCURRENT. In the first pass, where x=1, this point is illustrated as point 512 of FIG. 5. FIG. 5 shows a graph 500 using the same curve 304 of FIG. 3, but with different features emphasized.

After step 408, the processing circuit 106 executes step 410. In step 410, the processing circuit 106 generates a voltage VCURRENT equal to V1−(x+5)SMSTEP. Thereafter, in step 412, the processing circuit 106 obtains the flow reading FCURRENT from the flow sensor 110. The processing circuit 106 stores the table point having the voltage VCURRENT and its corresponding flow FCURRENT. In the first pass, where x =1, this point is illustrated as point 514 of FIG. 5.

After step 412, the processing circuit 106 executes step 414. In step 414, the processing circuit 106 generates a voltage VCURRFNT equal to V5=(x)LGSTEP. Thereafter, in step 416, the processing circuit 106 obtains the flow reading FCURRENT from the flow sensor 110. The processing circuit 106 stores the table point having the voltage VCURRENT and its corresponding flow FCURRENT. In the first pass, where x =1, this point is illustrated as point 516 of FIG. 5.

Then, in step 418, the processing circuit 106 determines whether x=5. If so, then the processing circuit 106 has completed filling in the table with points between V1 and V2. If not, however, then the processing circuit 106 repeats the process of steps 406 to 416 with the next value of x. To this end, in step 420, the processing circuit 106 increments x and then returns to step 406.

As a consequence, when x=2, the processing circuit 106 executes step 406 through 416 to add three more points to the table adjacent to the three points added by the first execution of steps 406 through 416. When x=3, then the processing circuit 106 executes steps 406 through 416 to add three more points to the table adjacent the points added when x=2. The process continues until after steps 406 through 416 are performed when x=5. Thus, the points between V1 and V2 are measured using interleaving.

Figure 6:
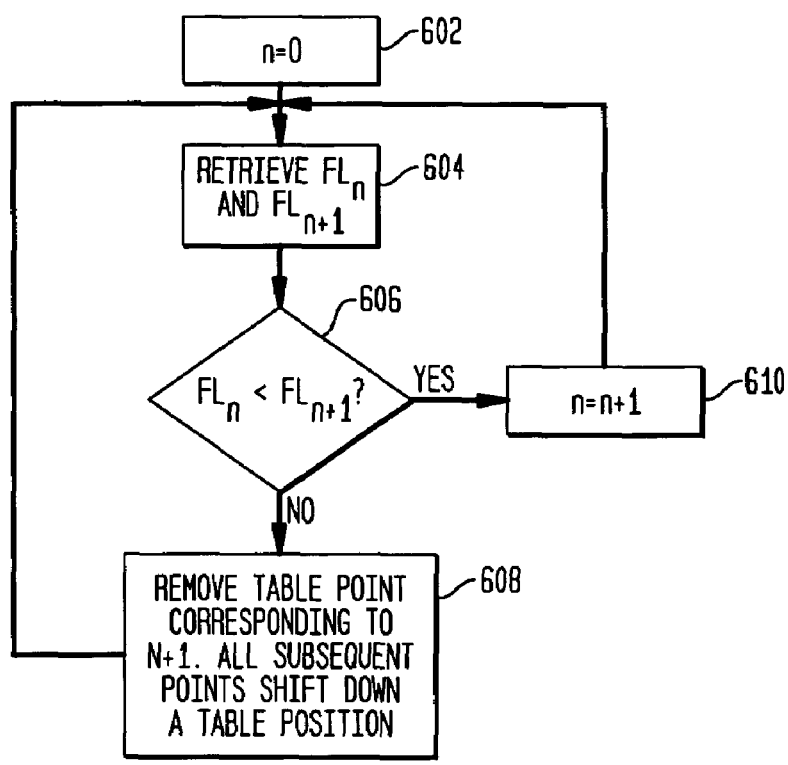
FIG. 6 shows a flow diagram of an exemplary set of operations that may be carried out to verify the calibration procedure.

FIG. 6 shows in detail an exemplary verification process that may be used as step 220 of the flow diagram of FIG. 2. The verification process is used to determine whether any points of the flow-voltage table 107 are not reliable, or do not fit the curve well. Such points could be the result of an error occurring during the calibration process. Many verification processes may be used. The process shown in FIG. 6 is one example that is particularly efficient, but by no means is the only process. In general, the process in FIG. 6 ensures that flow values increase monotonically as a function of voltage values for the table points.

In step 602, the processing circuit 106 sets a counter n=0. The counter is used to identify table position. Table position is referenced by the actuator voltage value for the table point.

In step 604, the processing circuit 106 retrieves the stored flow value $FL_n$ corresponding to the voltage at-the nth position on the table and the flow value $FL_{n+1}$ corresponding to the voltage at the next position on the table. The position on the table increments from left to right on the graph of FIG. 5. Thus, n=0 table position is V0, the n=1 position is V2, the n=6 position is the voltage corresponding to point 516, the n=7 position is V5, and so forth. Thus, the processing circuit 106 retrieves the stored flow values corresponding to adjacent voltage values on the flow-voltage table 107 generated in steps 202-218.

In step 606, the processing circuit 106 determines whether $FL_n < FL_{n+1}$. In other words, the processing circuit 106 determines whether the stored flow values increase monotonically as a function of voltage values for the stored table points. If not, then the processing circuit executes step 608. If so, however, then the processing circuit executes step 610. It will be appreciated that retrieve the values and storing the values in steps 604 and 606 may readily be carried output by a single software command in many software languages. The use of separate steps as discussed herein is for illustration purposes.

In step 608, the table point at n+1 is considered invalid and removed from the table. Then, the next table point becomes the table point at n+1. The processing circuit 106 then returns to step 604 to compare the same nth table point flow value with the flow value of that new n+1 table point.

In step 610, the table point at n+1 has been determined to be valid. The processing circuit 106 consequently increments n and returns to step 604.

Steps 604-610 are repeated until the entire table has been traversed. The result of the execution of the operations of FIG. 6 is that any table points that do not fit a monotonically increasing curve, in other words, every voltage point has a corresponding stored flow value that is greater than the flow value for any lower voltage point, are removed from the table.

In addition, if desired, the processing circuit 106 may determine that if more than a predetermined number of points are discarded, for example, more than 20% of the points, then the entire table is deleted and the process is started again at step 202 of FIG. 2.

Figure 7:
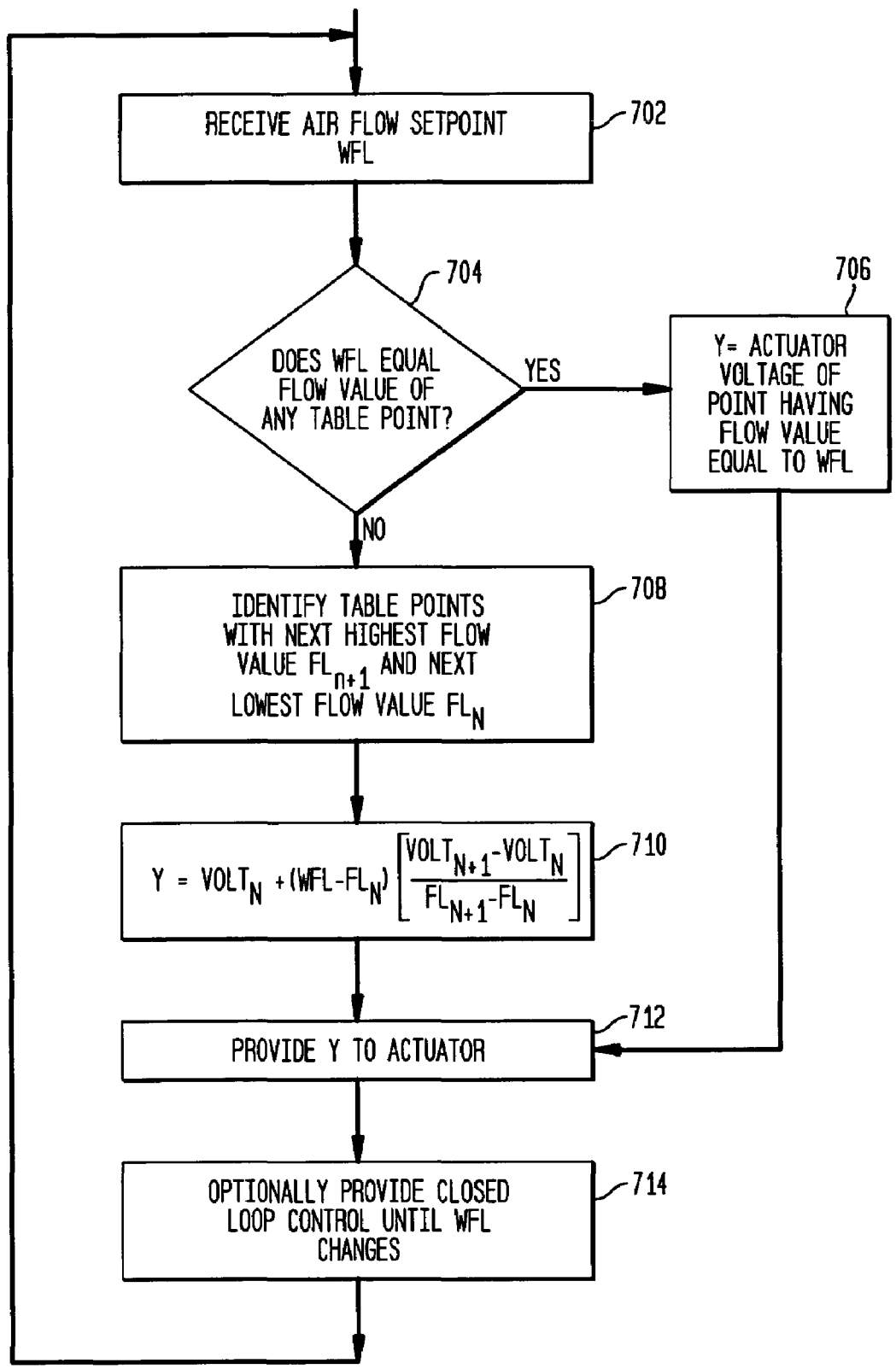
FIG. 7 shows a flow diagram of an exemplary set of operations for controlling the operation of a Venturi valve calibrated in accordance with the present invention.

As discussed above, the processing circuit 106 preferably further operates as the controller for the valve 104 and actuator 108 during normal operation. FIG. 7 shows a flow diagram of exemplary operations that may be carried out by the processing circuit 106 in controlling the operation of the valve 104 and actuator 108 to provide desired air flow in the output conduit 112 of FIG. 1.

In step 702, the processing circuit 106 receives a flow set point WFL. The flow set point WFL is representative of a desired air flow value for the output conduit 112. The flow set point is often generated by the controller of a larger process, such as a room temperature controller, or a fume hood exhaust controller. The source of the flow set point WFL may suitably be any source without departing from the invention.

In step 704, the processing circuit 106 determines whether any of the flow values for the data points on the table generated in FIG. 2 are exactly equal to the flow set point WFL. If so, then in step 706 the processing circuit 106 sets the output actuator voltage Y to the voltage value for the table point having the flow value equal to the flow set point WFL. In other words, if the flow set point WFL is equal to the flow value corresponding to V5 (see FIG. 5), then in step 706 the processing circuit 106 sets the Y=V5.

If, however, it is determined in step 704 that none of the flow values in the table are exactly equal to the flow set point WFL, as will often be the case, then the processing circuit 106 proceeds to step 708. In step 708, the processing circuit 106 identifies the data point on the table 107 having the next highest flow value $FL_{N+1}$, and the data point on the table 107 having the next lowest flow value $FL_N$. Thus, N describes the table point of the next lowest value determined in step 708, and N+1 describes the table point of the next highest value.

After step 708, the processing circuit 106 executes step 710 to estimate the appropriate voltage for the actuator. To this end, in step 710, the processing circuit 106 uses interpolation between the surrounding points N and N+1 identified in step 708 to identify the voltage value that corresponds to the flow set point WFL. That voltage is then used as the actuator output voltage Y. Thus, $$Y = VOLT_N + (WFL - FL_N)[(VOLT_{N+1} - VOLT_N)/(FL_{N+1} - FL_N)],$$

where V0LTx is the stored flow value for a table point x.

Of course, other methods of interpolation may be used. Moreover, other methods of estimating a voltage value Y corresponding to the set point WFL based on one or more existing data points of the table may be used.

After execution of either step 706 or step 710, the processing circuit 106 has determined an actuator output voltage value Y. The processing circuit 106 thereafter executes step 712. In step 712, the processing circuit 106 provides an actuator output signal that causes a voltage of Y to be provided to the actuator 108. Referring to FIG. 1, the actuator 108 adjusts the shaft 124 accordingly, which ideally causes the valve 104 to provide an output flow value approximately equal to WFL.

Thereafter, in step 714, the processing circuit 106 may optionally perform closed loop control to reduce the error between the desired flow WFL, and the actual air flow at the output 112. To this end, the processing circuit 106 obtains flow measurements XFL from the flow sensor 110 and employs control algorithms to adjust Y based on WFL and XFL. Suitable control algorithms are well known, and include for example, proportional-integrative-derivative (PID) control algorithms. The processing circuit 106 remains at step 714 to use closed loop control until the set point WFL changes. When the set point WFL changes, the processing circuit 106 temporarily halts the closed loop control and returns to step 702.

It will be appreciated that the above described embodiments are merely exemplary, and that those of ordinary skill in the art may readily devise their own implementations and modifications that incorporate the principles of the present invention and fall within the spirit and scope thereof. At least some of the inventive concepts described herein may have application even when calibration occurs prior to installation of the valve assembly.

Moreover, at least some aspects of the invention, are applicable to any valve that performs the general function of a Venturi valve, namely, providing an adjustable, regulated air flow output over a range of varying source pressure. Specifically, the invention would benefit a regulated output valve that uses mechanical elements (i.e. the spring mechanism or the like) to maintain a regulated output flow. Aspects of the invention are also applicable to water valves providing an analogous function.

We claim:

1. An arrangement for calibrating a Venturi valve, the Venturi valve having a variable shaft position, the Venturi valve operable to provide an air flow corresponding to the variable shaft position, the arrangement comprising:
   a source of flow measurements; and
   a processing circuit operable to
      provide a plurality of voltages to an actuator, the actuator operable to change the variable shaft position dependent on said plurality of voltages,
      receive from the source of flow measurements a flow measure for each variable shaft position corresponding to each of the plurality of voltages, and
      store information representative of the relationship between each of the plurality of voltages and the flow measures.

2. The arrangement of claim 1 wherein the processing circuit is further operable to:
   provide first plural test voltages to the actuator to determine a first voltage of the plurality of voltages associated with a first measured flow value;
   after determining the first voltage, provide second plural test voltages to the actuator to determine a second of the plurality of voltages associated with a second measured flow value;
   after determining the second voltage, provide a set of other voltages to the actuator, and obtain a corresponding flow measurement for each of the set of other voltages, the set of other voltages being between the first voltage and the second voltage; and
   wherein the plurality of voltages includes the first voltage, the second voltage and the set of other voltages.

3. The arrangement of claim 1 wherein the processing circuit includes a controller operably coupled to receive a flow set point from an external device, the controller further operable to cause a select output voltage to be provided to the actuator, the select output voltage based at least in part on the flow set point and the stored information.

4. The arrangement of claim 1 wherein the processing circuit is further operable to store information representative of the relationship between each of the plurality of voltages and the flow measures in the form a table that identifies a correspondence between each of the plurality of voltages and the corresponding flow measure.

5. The arrangement of claim 1 wherein a voltage difference between a first set of voltages in the plurality of voltages is greater than a voltage difference between a second set of voltages in the plurality of voltages.

6. The arrangement of claim 1 wherein the processing circuit is further operable to store information representative of the relationship between each of the plurality of voltages and the flow measures by:
   obtaining candidate information representative of the relationship;
   performing a verification operation on the candidate information;
   storing information representative of the relationship between each on the plurality of voltages and the flow measures based on a set of verified candidate information.

7. The arrangement of claim 1 wherein the processing circuit is further operable to:
   determine a first voltage associated with a first flow value,
   determine a second voltage associated with a second flow value, and
   provide a set of other voltages to the actuator and obtaining a corresponding flow measurement for each of the set of other voltages, the set of other voltages being between the first voltage and the second voltage, and
   wherein the plurality of voltages includes the first voltage, the second voltage and the set of other voltages.

8. The arrangement of claim 7 wherein the processing circuit is further operable to determine a first voltage by:
   providing a maximum voltage to the actuator;
   obtaining a maximum flow measure corresponding to the maximum voltage;
   determining the first flow value as a fractional portion of the maximum flow measure; and
   determining the first voltage associated with the first flow value.

9. The arrangement of claim 7 wherein the second flow value is approximately a rated minimum controllable flow value for the valve.

10. The arrangement of claim 7 wherein the processing circuit is further operable to provide the set of other voltages by:
    providing the set of other voltages in an interleaved sequence, wherein the voltage difference between any two voltages provided in the interleaved sequence exceeds the voltage between any two adjacent voltages in the set of other voltages.

11. A method of calibrating a Venturi valve, the Venturi valve having a variable shaft position, the Venturi valve operable to provide an air flow corresponding to the variable shaft position, the method comprising:
    a) installing the Venturi valve in a facility;
    b) after installing the Venturi valve, providing a plurality of voltages to an actuator, the actuator operable to change the variable shaft position dependent on said plurality of voltages,
    c) receiving from a source of flow measurements a flow measure for each variable shaft position corresponding to each of the plurality of voltages,
    d) storing information representative of the relationship between each of the plurality of voltages and the flow measures; and
    e) using the Venturi valve as a part of a system that regulates air flow within the facility.

12. The method of claim 11 wherein steps b) and c) further comprise:
    providing first plural test voltages to the actuator to determine a first voltage of the plurality of voltages associated with a first measured flow value,
    providing second plural test voltages to the actuator to determine a second of the plurality of voltages associated with a second measured flow value, and
    providing a set of other voltages to the actuator, and obtaining a corresponding flow measurement for each of the set of other voltages, the set of other voltages being between the first voltage and the second voltage, and wherein the plurality of voltages includes the first voltage, the second voltage and the set of other voltages.

13. The method of claim 11 further comprising:
receiving a flow set point from an external device; and
employing a controller to cause a select output voltage to be provided to the actuator, the select output voltage based at least in part on the flow set point and the stored information.

14. The method of claim 11 wherein step d) further comprises storing Information representative of the relationship between each of the plurality of voltages and the flow measures in the form a table that identifies a correspondence between each of the plurality of voltages and the corresponding flow measure.

15. The method of claim 14 wherein a voltage difference between a first set of voltages in the plurality of voltages is greater than a voltage difference between a second set of voltages in the plurality of voltages.

16. The method of claim 11 wherein step d) further comprises storing Information representative of the relationship between each of the plurality of voltages and the flow measures by:
obtaining candidate information representative of the relationship;
performing a verification operation on the candidate information; and
storing information representative of the relationship between each on the plurality of voltages and the flow measures based on a set of verified candidate information.

17. A method of calibrating a Venturi valve, the Venturi valve having a variable shaft position, the Venturi valve operable to provide an air flow corresponding to the variable shaft position, the method comprising:
a) determining a first actuator voltage associated with a predetermined first flow value;
b) determining a second actuator voltage associated with a predetermined second flow value;
c) providing a set of other voltages to the actuator and obtaining a corresponding flow measurement for each of the set of other voltages, the set of other voltages being between the first actuator voltage and the second actuator voltage; and
d) storing information representative of the relationship between each of a plurality of voltages and the flow measures, the plurality of voltages including the first actuator voltage, the second actuator voltage and the set of other voltages.

18. The method of claim 17 wherein step a) further comprises:
providing a maximum voltage to the actuator;
obtaining a maximum flow measure corresponding to the maximum voltage;
determining the first flow value as a fractional portion of the maximum flow measure; and
determining the first voltage associated with the first flow value.

19. The method of claim 17 wherein the second flow value is approximately equal to a rated minimum controllable flow value for the valve.

20. The method of claim 17 wherein step c) further comprises:
providing the set of other voltages in an interleaved sequence, wherein the voltage difference between any two voltages provided in the interleaved sequence exceeds the voltage between any two adjacent voltages in the set of other voltages.

21. An arrangement for calibrating a valve, the valve having a variable shaft position, the valve operable to provide a flow corresponding to the variable shaft position, the arrangement comprising:
a source of flow measurements; and
a processing circuit operable to
provide a plurality of voltages to an actuator, the actuator operable to change the variable shaft position dependent on said plurality of voltages,
receive from the source of flow measurements a flow measure for each variable shaft position corresponding to each of the plurality of voltages, and
store information representative of the relationship between each of the plurality of voltages and the flow measures.

22. The arrangement of claim 21 wherein the processing circuit is further operable to:
provide first plural test voltages to the actuator to determine a first voltage of the plurality of voltages associated with a first measured flow value;
after determining the first voltage, provide second plural test voltages to the actuator to determine a second of the plurality of voltages associated with a second measured flow value;
after determining the second voltage, provide a set of other voltages to the actuator, and obtaining a corresponding flow measurement for each of the set of other voltages, the set of other voltages being between the first voltage and the second voltage; and
wherein the plurality of voltages includes the first voltage, the second voltage and the set of other voltages.

23. The arrangement of claim 21 wherein the valve is an air flow valve.

24. The arrangement of claim 23 wherein the valve is a regulated output air flow valve.

25. The arrangement of claim 21 wherein the processing circuit is further operable to:
determine a first voltage associated with a first flow value,
determine a second voltage associated with a second flow value, and
provide a set of other voltages to the actuator and obtaining a corresponding flow measurement for each of the set of other voltages, the set of other voltages being between the first voltage and the second voltage, and
wherein the plurality of voltages includes the first voltage, the second voltage and the set of other voltages.

26. The arrangement of claim 25 wherein the processing circuit is further operable to provide the set of other voltages by:
providing the set of other voltages in an interleaved sequence, wherein the voltage difference between any two voltages provided in the interleaved sequence exceeds the voltage between any two adjacent voltages in the set of other voltages.

* * * * *